UNITED STATES PATENT OFFICE.

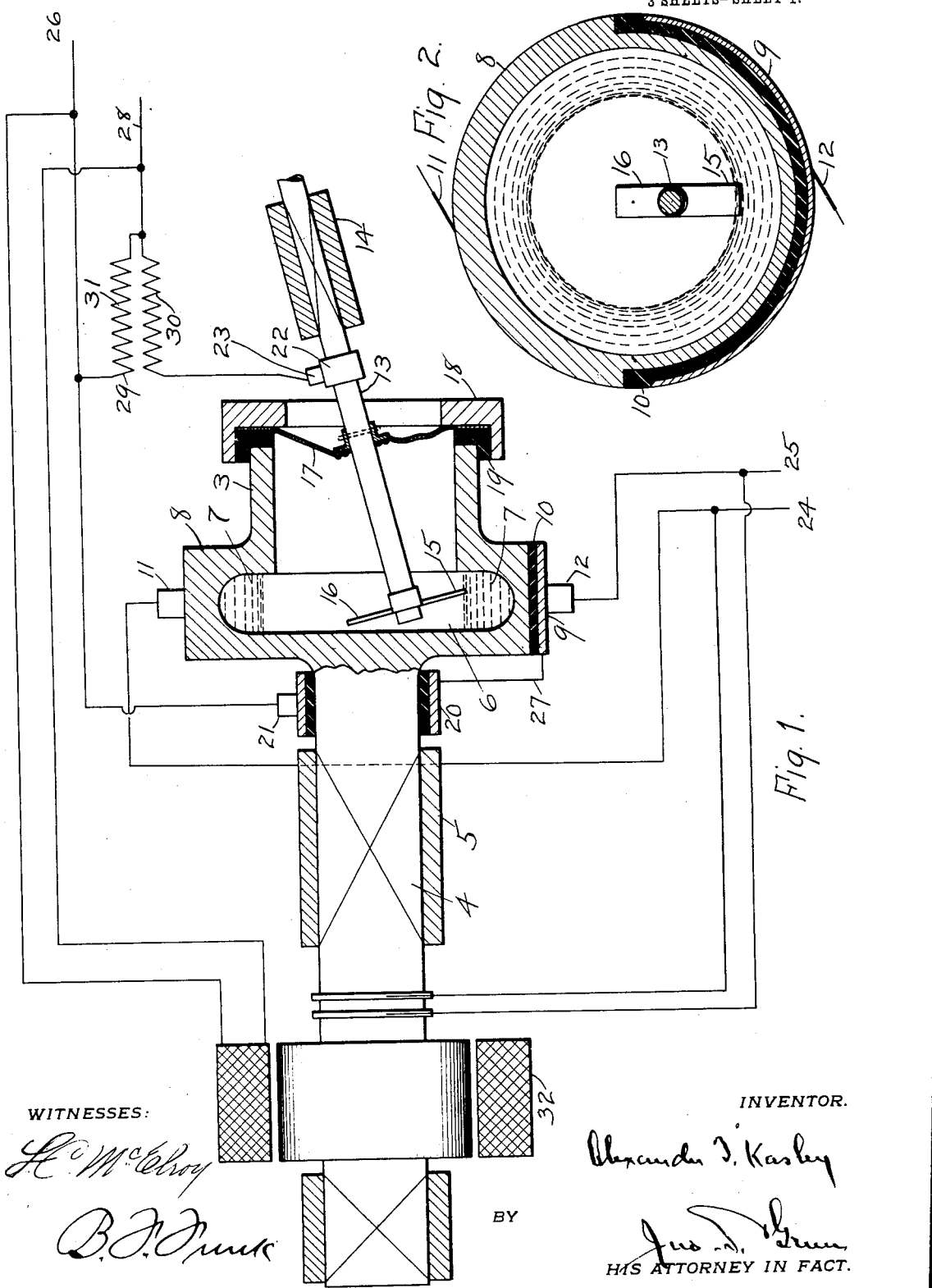

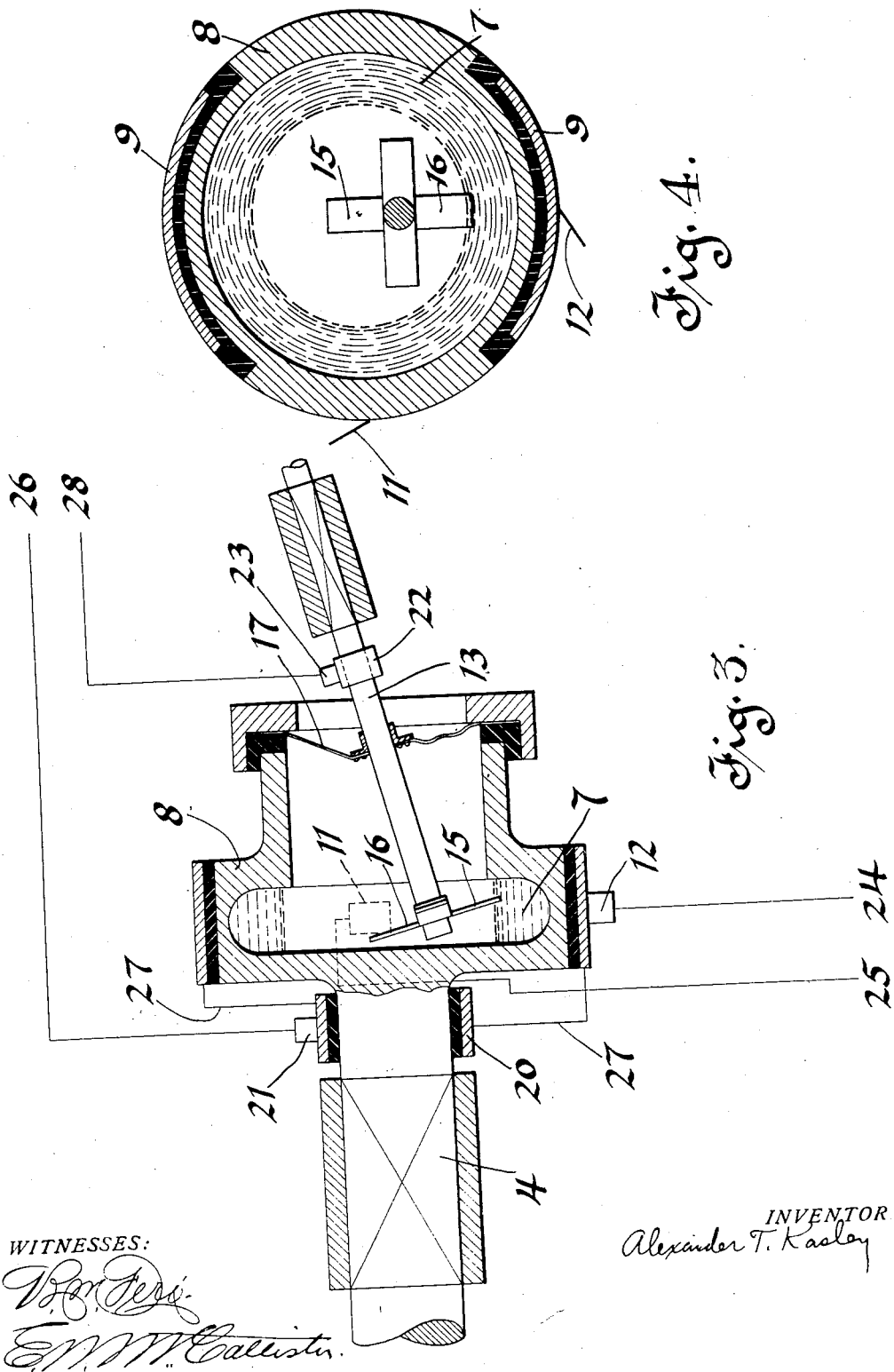

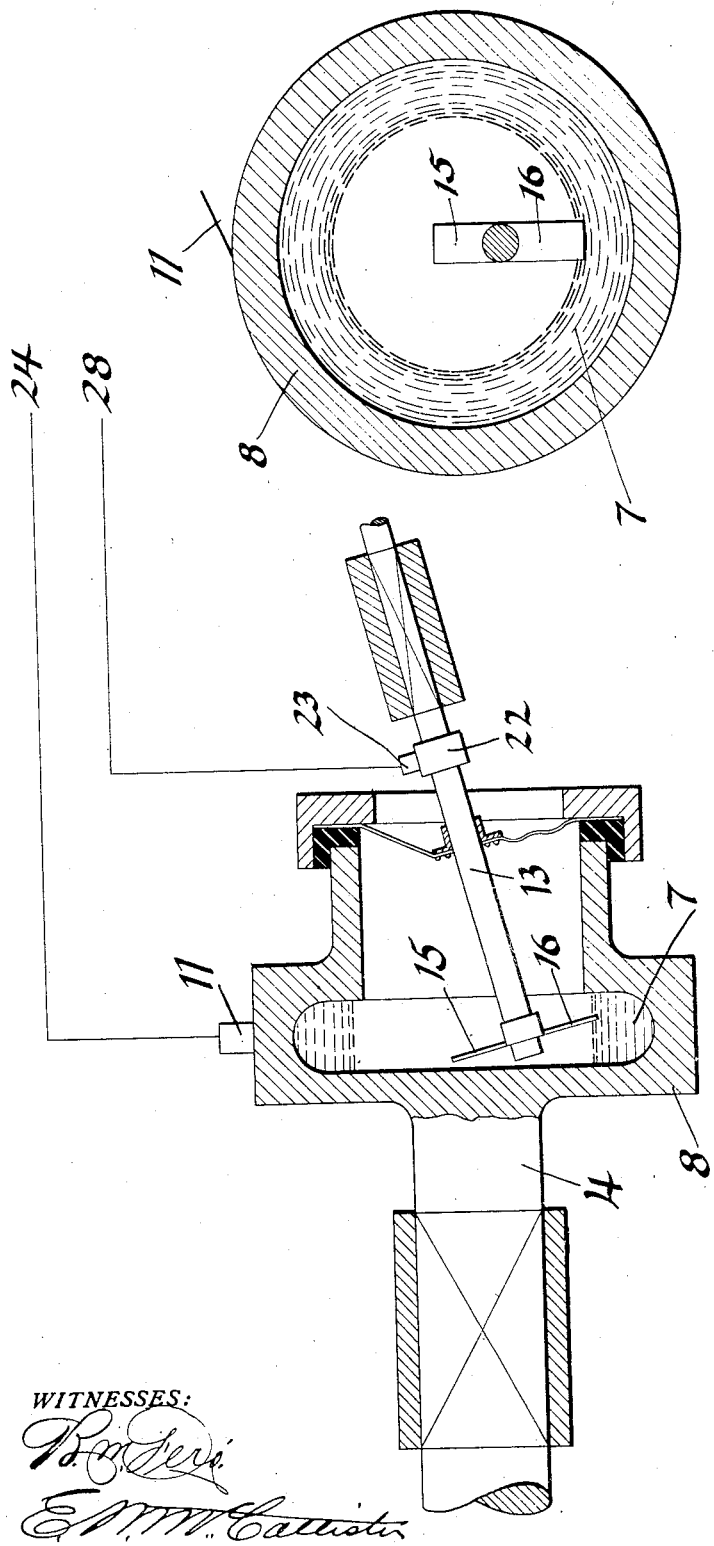

ALEXANDER T. KASLEY, OF SWISSVALE, PENNSYLVANIA.

ELECTRIC-CURRENT CONVERTER.

1,112,913.
Specification of Letters Patent.
Patented Oct. 6, 1914.

Application filed October 12, 1905. Serial No. 282,421.

*To all whom it may concern:*

Be it known that I, ALEXANDER T. KASLEY, a citizen of the United States, and a resident of Swissvale, in the county of Allegheny and State of Pennsylvania, have invented a new and useful Improvement in Electric-Current Converters, of which the following is a specification.

This invention relates to electrical current converting apparatus, and an object has been the production of a simple apparatus whereby alternating current may be converted into direct current, or direct into alternating.

In carrying out this invention, which was primarily intended as a rectifier for converting alternating into direct current, I have discovered that apparatus embodying the same may be used for converting direct current into alternating. I have also discovered that the interrupter utilized in the apparatus, which in itself is novel, may be utilized as a most efficient circuit breaker or current interrupter, as with it the evil effects which result from the arcs formed when the circuit is broken, are overcome.

For the sake of illustration, I have selected a simple form and have shown that in a more or less diagrammatic manner so far as the wiring is concerned.

In the drawings, which illustrate a device for converting alternating into direct current, Figure 1 is a view showing the device in longitudinal section with the wiring diagram included, and Fig. 2 is a view in cross-section of the device. Fig. 3 is a sectional view of an apparatus embodying a modification of my invention. Fig. 4 is a transverse section of the apparatus shown in Fig. 3. Fig. 5 is a sectional elevation of an embodiment of my invention adapted to be utilized as a circuit breaker, and Fig. 6 is a transverse section of Fig. 5.

The device illustrated in Figs. 1 and 2 consists of a casing 3 carried on a shaft 4 which is journaled within and overhangs a bearing 5. The casing is provided with a cylindrical chamber 6, concentric with shaft 4, which contains a body of mercury 7 or some fusible metal which will form a suitable liquid conductor. The outer periphery of casing 3 is formed in the nature of a two-part commutator comprising bars 8 and 9; bar 8 is in contact with the body of mercury, and bar 9 is insulated therefrom through insulating material 10. Suitable brushes 11 and 12 are arranged to bear on this commutator at diametrically opposite points.

A shaft 13, journaled within a bearing 14, is set at an angle to the shaft 4 and is provided with two contact arms 15 and 16 situated within the chamber 6 of casing 3. Through a suitable flexible driving member, such as 17, shaft 13 is adapted to be rotated as the casing 3 is rotated. The flexible driving member 17 may be a metallic diaphragm, or rubber or leather diaphragm. When a diaphragm is used it serves as a means for closing the open end of the casing, thus preventing the mercury vapor which forms therein from escaping. It has been found by trial that if the diaphragm be made of material similar to cloth-inserted rubber or corrugated metal which is easily bent but not easily stretched, then the diaphragm drives the shaft properly. Between the end-cap 18 of the casing, to which the diaphragm or driving means for shaft 13 is connected, and the casing proper, an insulating member 19 is interposed, and it is desirable that this member 19 shall be a heat insulator as well as an electrical insulator. A slip-ring 20 is carried by shaft 4 and a brush 21 bears thereagainst. A slip-ring 22 is carried by shaft 13 and a brush 23 is provided therefor.

Brushes 11 and 12 are connected with a source of alternating current through leads 24 and 25 respectively. When the apparatus is in operation and the casing is rotated, the body of mercury will take the form of an annulus, as shown in the drawings, and will be held against the cylindrical wall of chamber 6 by centrifugal force. In operation, the contact arms 15 and 16, carried by shaft 13, alternately move in and out of contact with the mercury annulus.

A distributer lead 26, delivering direct current, connects with slip-ring 20 through its brush 21. Slip-ring 20 is in electrical contact with bar 9 of the commutator through a conductor 27, which is shown as a wire. The other distributer lead 28 delivering direct current connects with slip-ring 22 through brush 23, and a transformer or choke-coil 29, having two parallel windings 30 and 31 of an equal number of turns, is placed as illustrated in Fig. 1.

In the position illustrated in the drawings the current enters by wire 24 through brush 11, through the commutator bar 8, through the mercury and out the wire 28. When the current is reversed it enters by wire 25, brush 12, and the commutator bar 8, which will then be under brush 12, and through the mercury out through wire 28 as before.

The shaft 13 is so arranged that the circuit between the wires 24 and 28 is broken by the arm 15 or 16 leaving the mercury in the chamber 6 at the time of zero, or practically zero current, and the arms are so positioned on the shaft 13 relative to the commutator bars that the circuit is always interrupted by one of the arms leaving the mercury annulus prior to the time the brushes move from one to the next commutator bar; consequently there is no sparking at the brushes and the spark encountered at the chamber 6 will be insignificant, as the voltage at the time of the break is low. The transformer 29 is connected as shown to maintain the continuity of the current flowing in the wire 28.

I have employed the term "continuity" because there are certain classes of direct current apparatus, such as mercury arc lamps and metallic flame arc lamps in which the current can fall off to a low value without putting out the light, but if it is completely interrupted, the lights will have to be relighted. When the contact arm 15 contacts with the mercury of the mercury annulus, current will flow in the circuit including lead 25, brush 12, lead 27, brush 21, coil 31, coil 30, brush 23, contact 15, brush 11, and lead 24. This current is a loss. Its value depends on the resistance of the coils 31 and 30, and the coil 31 will preferably have a high resistance which does not interfere seriously with the performance of its function in preserving the continuity of current flow, since a very small current is all that is necessary. The apparatus, however, will operate with any resistance which is commercially practical. The preponderance of current in one direction flowing through the coils will make it almost useless to use the iron cores, as they will be saturated and the resistance of an air transformer will be high on account of the number of turns required.

When the circuit is broken by the contact arm 16 passing out of contact with the mercury, the magnetic flux in the transformer begins to fall and a voltage is immediately induced in the winding 31, which furnishes the current to the wire 28. As soon as the contact arm 15 enters the mercury the current is started in the wire 30 and falls to zero or below in the wire 31. When utilizing this device as an alternating current rectifier, the shaft 4 may be driven from the alternating current generator or by a synchronous motor. If it is desired to transmit the alternating current any distance before it is rectified the shaft 4 will be driven by a synchronous motor 32.

When it is desired to transform direct current into a flat-top-curve alternating current, the operation as above outlined is reversed; the transformer or choke-coil is omitted and the leads 26 and 28 are connected to the source of the direct current supply as shown in Fig. 4. The leads 24 and 25 then become the distributing leads for the alternating current. The speed of the transformer may be varied in accordance with the number of alternations in the current desired, or the shaft 13 may be provided with more than two arms and the commutator provided with a corresponding number of bars. A corresponding construction may be utilized in changing alternating current to direct.

In the construction shown the contact arms 15 and 16 are of such a length and are so positioned relative to the commutator bars that they break contact with the mercury in advance of the break between the brush and the commutator bar. Under these conditions the sparking is transferred from the commutator to the interrupter.

When it is desired to use the interrupter or circuit breaker independently the wires 25 and 26 are omitted, the commutator is done away with and the brushes 11 and 23 are positioned as shown in Fig. 5, the brush 11 bearing on the mercury container which is in constant electrical contact with the mercury. Current then enters the circuit through the wire 24, the brush 11 and is transmitted to the mercury annulus through the metal casing 8. From the mercury annulus the current is transmitted through the shaft 13, the slip-ring 22 and the brush 23 to the wire 28.

In converting direct current to alternating it may be found desirable, because of the high temperatures encountered at the arc, to utilize a fusible metal in the chamber 6, and in such cases the metal will have to be melted before the device is started.

Many and various modifications may be made in this apparatus without departing from the spirit of this invention, as the same is considered generic.

Having thus described my invention, what I claim as new is:

1. A current interrupter comprising a rotatable casing, a conducting liquid annulus sustained within the casing by centrifugal force and forming a terminal of the interrupter, a contact agent forming a terminal of the interrupter, and pliant imperforate means for sealing the casing and for connecting the contact agent to the casing.

2. A current interrupter comprising a rotatable casing, a conducting liquid annulus sustained within the casing by centrifugal force and forming a terminal of the interrupter, a rotatable contact agent forming a terminal of the interrupter and adapted to move into and out of the liquid annulus during its rotation, and a pliant cover for the casing connecting the contact agent to the casing.

3. A current interrupter comprising a rotatable casing, a conducting liquid annulus sustained within the casing by centrifugal force and forming a terminal of the interrupter, a rotatable contact agent forming a terminal of the interrupter and adapted to move into and out of the annulus during its rotation, a flexible cover for the casing through which said contact agent projects, and means for securing the cover to the contact agent.

4. In a current interrupter a rotatable casing, a conducting liquid annulus sustained within the casing by centrifugal force and forming a terminal of the interrupter, a rotatable contact agent forming a terminal of the interrupter and adapted to move into and out of said liquid annulus, a pliant cover for the casing through which said agent projects, means for rigidly securing the agent to the cover, means for rigidly securing the cover to the casing, a circuit carrying a varying current, and means for rotating the casing and the agent synchronously with the current variations.

5. In combination in a current interrupter, a rotatable casing, a mercury annulus sustained within said casing by centrifugal force and forming a terminal of the interrupter, a contact agent operatively connected to said casing and adapted to move into and out of contact with said annulus and in synchronism with the current to be converted.

In testimony whereof, I have hereunto subscribed my name this 9th day of October, 1905.

ALEXANDER T. KASLEY.

Witnesses:
 DAVID WILLIAMS,
 G. L. RYDER.